(12) United States Patent
Tsirkin et al.

(10) Patent No.: US 9,606,825 B2
(45) Date of Patent: Mar. 28, 2017

(54) MEMORY MONITOR EMULATION FOR VIRTUAL MACHINES

(71) Applicant: Red Hat Israel, Ltd., Ra'anana (IL)

(72) Inventors: Michael Tsirkin, Raanana (IL); Paolo Bonzini, Milan (IT)

(73) Assignee: Red Hat Israel, Ltd, Ra'Anana (IL)

( * ) Notice: Subject to any disclaimer, the term of this patent is extended or adjusted under 35 U.S.C. 154(b) by 332 days.

(21) Appl. No.: 14/282,707

(22) Filed: May 20, 2014

(65) Prior Publication Data
US 2015/0339142 A1 Nov. 26, 2015

(51) Int. Cl.
*G06F 13/24* (2006.01)
*G06F 9/455* (2006.01)
*G06F 3/06* (2006.01)

(52) U.S. Cl.
CPC ............ *G06F 9/45558* (2013.01); *G06F 3/06* (2013.01); *G06F 3/065* (2013.01); *G06F 3/067* (2013.01); *G06F 3/0619* (2013.01); *G06F 3/0664* (2013.01); *G06F 13/24* (2013.01); *G06F 2009/45583* (2013.01)

(58) Field of Classification Search
USPC .................................. 710/104–110, 260–269
See application file for complete search history.

(56) References Cited

U.S. PATENT DOCUMENTS

| 9,256,455 | B2* | 2/2016 | Tsirkin | G06F 9/45558 |
| 2006/0200616 | A1* | 9/2006 | Maliszewski | G06F 9/45533 |
| | | | | 711/6 |
| 2009/0172284 | A1* | 7/2009 | Offen | G06F 12/084 |
| | | | | 711/125 |
| 2010/0115513 | A1* | 5/2010 | Moriki | G06F 9/463 |
| | | | | 718/1 |
| 2010/0199277 | A1* | 8/2010 | Galal | G06F 9/45533 |
| | | | | 718/1 |
| 2011/0161541 | A1* | 6/2011 | Madukkarumukumana | |
| | | | | G06F 13/24 |
| | | | | 710/260 |
| 2011/0202728 | A1* | 8/2011 | Nichols | G06F 9/461 |
| | | | | 711/141 |
| 2012/0131575 | A1* | 5/2012 | Yehuda | G06F 9/45558 |
| | | | | 718/1 |
| 2013/0227248 | A1* | 8/2013 | Mehta | G06F 12/1027 |
| | | | | 711/207 |
| 2014/0068302 | A1* | 3/2014 | Falik | G06F 9/4418 |
| | | | | 713/323 |
| 2014/0156894 | A1* | 6/2014 | Tsirkin | G06F 13/24 |
| | | | | 710/260 |
| 2014/0229648 | A1* | 8/2014 | Tsirkin | G06F 13/24 |
| | | | | 710/269 |
| 2015/0177997 | A1* | 6/2015 | Warszawski | G06F 9/45558 |
| | | | | 711/162 |

* cited by examiner

*Primary Examiner* — Raymond Phan
(74) *Attorney, Agent, or Firm* — Haynes and Boone, LLP

(57) ABSTRACT

According to one example, a method includes with a hypervisor, detecting that a guest has executed a memory monitor command for a virtual processor, making a copy of a memory address associated with the memory monitor command, the copy being placed in hypervisor memory, and with the hypervisor, in response to detecting that the guest system has executed a wait command, executing a loop until the copy is different than the data stored in the memory address.

20 Claims, 4 Drawing Sheets

MEMORY MONITOR EMULATION FOR VIRTUAL MACHINES

BACKGROUND

The present disclosure relates generally to virtual systems, and more particularly, to virtual processor management.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems.

A host machine typically uses a hypervisor to virtualize the underlying hardware of the host machine or emulate hardware devices, thus making the use of the virtual machine transparent to the guest operating system or the remote client that uses the virtual machine. The hypervisor manages allocation and virtualization of computer resources. An example of computer resources is a set of processors.

SUMMARY

According to one example, a method includes with a hypervisor, detecting that a guest has executed a memory monitor command for a virtual processor, making a copy of a memory address associated with the memory monitor command, the copy being placed in hypervisor memory, and with the hypervisor, in response to detecting that the guest system has executed a wait command, executing a loop until the copy is different than the data stored in the memory address.

A method includes, with a guest system running on a virtual machine, executing a memory monitor command for a virtual processor, wherein execution of the memory monitoring command causes a hypervisor to make a copy of data stored at a guest memory address associated with the memory monitor command, the copy being placed in a hypervisor memory address. The method further includes, with the guest system, executing a wait command to cause the hypervisor to execute a loop, the hypervisor being configured to exit the loop if a data value stored in the guest memory address is different than a data value stored in the copy. The method further includes in response to being interrupted by an event, causing the hypervisor to exit a loop.

A computing system includes a processor and a memory comprising computer readable instructions that when executed by the processor, cause the system to run a hypervisor to host a virtual machine, detect that a guest system utilizing the virtual machine has executed a memory monitor command for a virtual processor, make a copy of data stored at a guest memory address associated with the memory monitor command, store the copy in a hypervisor memory address, detect that the guest system has executed a wait command, execute a loop that includes a waiting operation in response to detecting the wait command, and exit the loop when the copy is different than the data stored in the memory address.

Figure 1:
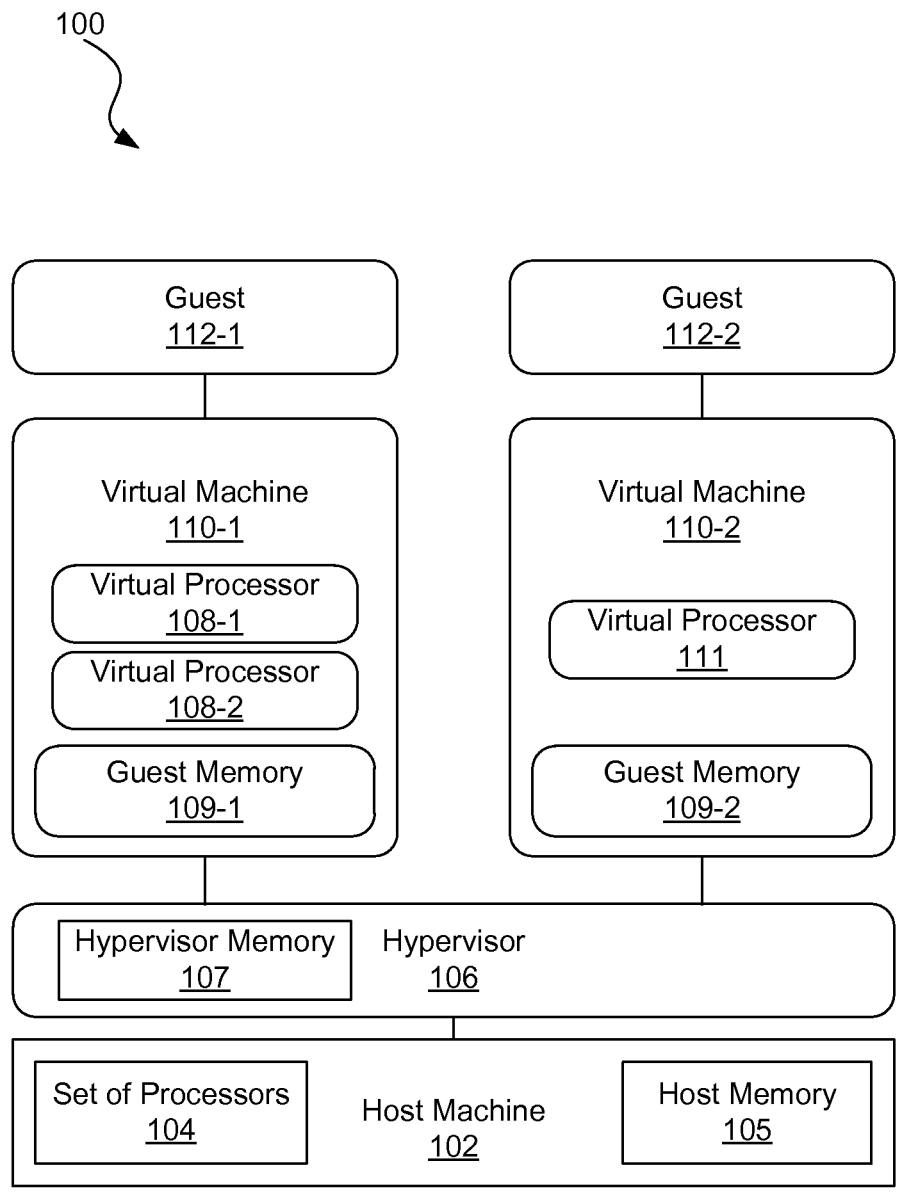
FIG. 1 is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Processors can utilize a feature that allows one processor to wake another processor from a halt state without using interrupts, thereby increasing efficiency of inter-process communication. Using x86 instruction set architecture as an example, this feature includes a MONITOR command and an MWAIT command. The MONITOR command causes the processor hardware to monitor a range of memory addresses designated by the MONITOR command. If data is stored to an address within the range of memory address, a signal is triggered within the processor hardware. This signal may be used by the MWAIT command.

The MWAIT command causes the processor to enter a halt state until data has been written to a memory address within the range designated by the MONITOR command. If one processor is in a halt state as a result of the MWAIT command, then another processor can bring that processor out of the halt state by storing data at an address within the designated address range specified by the MONITOR command. Thus, one processor can awaken another processor without using interrupts.

Virtual processors do not generally have this feature. Thus, a virtual machine utilizing multiple virtual processors is not able to provide this functionality to a guest operating system running on that virtual machine. Thus, inter-process communication within the virtual machine context often causes an exit from the virtual machine context, thereby increasing latency.

According to principles described herein, a hypervisor may allow for emulation of the memory monitoring functionality associated with the MONITOR and MWAIT commands. In one example, the hypervisor detects that a guest operating system executes the MONITOR command for a first virtual processor. The MONITOR command designates a range of memory addresses within guest memory to be monitored. Guest memory is memory within the host system's memory (either physical memory or virtual memory) that has been designated for use by the virtual machine associated with the guest. The hypervisor then copies the data stored in that specific range of addresses into hypervisor memory. Hypervisor memory is memory within the host system's memory that is designated for use by the hypervisor. After the guest operating system executes the MWAIT command, the hypervisor then executes a loop that includes a waiting operation that puts the first virtual processor in a state that is analogous to a halt state. The loop also includes determining whether the data stored in the guest memory is different than the data stored in the hypervisor memory. If the guest memory is different than the hypervisor memory, then it is known that a second virtual processor has caused a change to that guest memory, thus intending to awaken the first processor. This allows virtual processors to work more efficiently in concert on behalf of a guest operating system.

The following description discusses memory monitoring functionality in terms of the MONITOR and MWAIT commands, which are specific to x86 instruction set architecture. But, the principles described herein are also applicable to different instruction set architectures that have functions that are analogous to the MONITOR and MWAIT commands of the x86 instruction set architecture.

FIG. 1 is a diagram showing an illustrative system 100 involving a plurality of virtual machines 110. According to the present example, a physical system, such as a host machine 102 includes hardware such as a set of processors 104 and a memory 105. The system 100 includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure.

The hypervisor 106 allows for multiple virtual machines, and thus multiple guests 112, to run on the same physical host machine 102. Additionally, the host machine 102 may run the multiple guests 112 concurrently and in isolation from other programs on the host machine 102. One guest 112-1 may run a different operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 107 or for use by the virtual machines 110. These blocks of memory may be ranges of physical memory addresses or virtual memory addresses.

The host machine 102 also includes a set of processors 104 for executing software (e.g., machine readable instructions) and using or updating data stored in memory 105. The software may include an operating system, the hypervisor 106 and various other software applications. The processors 104 may include one or more processors acting in concert. Additionally, the set of processors 104 may include one or more virtual processors 108.

In the example illustrated in FIG. 1, virtual machines 110 are platforms on which the guests 112 run. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of CPU, memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory 109 to guest 112-1. The hypervisor 106 may map the memory locations of guest memory 109 to physical memory locations of memory 105.

To facilitate multiple virtual machines 110 simultaneously, hardware resources are shared among the hypervisor 106 and one or more guests 112. The physical processors 104 of the host machines enter and exit the context of different virtual machines 110 and the hypervisor 106. A virtual machine exit marks the point at which a transition is made between the virtual machine 110 currently running and the hypervisor 106, which takes over control for a particular reason. During an exit, the processor 104 may save a snapshot of the state of the virtual machine that was running at the time of exit. The virtual machine exit is handled by the hypervisor 106, which decides the appropriate action to take and then transfers control back to the virtual machine 110 via a virtual machine entry. A virtual machine entry marks the point at which a transition is made between the hypervisor 106 and a virtual machine 110, which takes over control. If the hypervisor 106 has entered a virtual machine 110, the processor 104 is within the context of that virtual machine 110. If the hypervisor 106 has not entered any virtual machine, the processor 104 is in the context of the hypervisor 106.

According to one example, a process being run by the first virtual processor 108-1 may wish to communicate with a process being run by the second virtual processor 108-2. As described above, physical processors can use the MONITOR and MWAIT functionality to perform such inter-process communication. But, virtual processors do not generally have such capability. Thus, to allow such inter-process communication, the hypervisor 106 detects that the guest 112-1 has executed the MONITOR command for the first virtual processor 108-1. After the hypervisor 106 detects that the guest has executed the MONITOR command, the hypervisor 106 makes a copy of the data stored in the address range indicated by the MONITOR command. The address range associated with the MONITOR command will be referred to as the designated address range. The copy of the data within the designated address range is put into hypervisor memory 107.

When the hypervisor detects that the guest has executed the MWAIT command, the hypervisor 106 then executes a loop. Within the loop, the hypervisor 106 performs a waiting operation for the first virtual processor 108-1. The waiting operation will be discussed in further detail below. Additionally, within the loop, the hypervisor 107 compares the data in the designated range of addresses with the copy of the data stored in the hypervisor memory 107. If the data is the same, then the loop continues. But, if the data is not the same, then the hypervisor 106 exits the loop. If the data is not the same, this means that another device has executed a store command to the address within the range of addresses specified by the MONITOR command. In one example, the other device that writes to the address within the designated address range is a different virtual processor. The different virtual processor may be the second virtual processor 108-2 of virtual machine 110-1. In one example, the different virtual processor is the virtual processor 111 of a different virtual machine 110-2. By executing the store command, and writing data to an address within the designated address range in the guest memory 109, the first virtual processor 108-1 is awakened.

In one example, virtual processor 108-1 and virtual processor 108-2 are executing different processes. These different processes may wish to communicate with one another. When one virtual processor 108-1 has to wait on the other virtual processor 108-2 to perform an operation before proceeding, the virtual processors can utilize the memory monitoring emulation principle described above. Specifically, the guest 112-1 can execute the MONITOR command and the MWAIT command for the first virtual processor 108-1. This will cause the first virtual processor 108-1 to operate in a manner that is analogous to a halt state. When the second virtual processor 108-2 wishes to awaken the first virtual processor, the process associated with the second virtual processor 108-2 performs a store operation to a memory address within the designated memory address associated with the MONITOR command. This effectively awakens the first virtual processor 108-1 without using interrupts, thereby providing increased efficiency.

Figure 2:
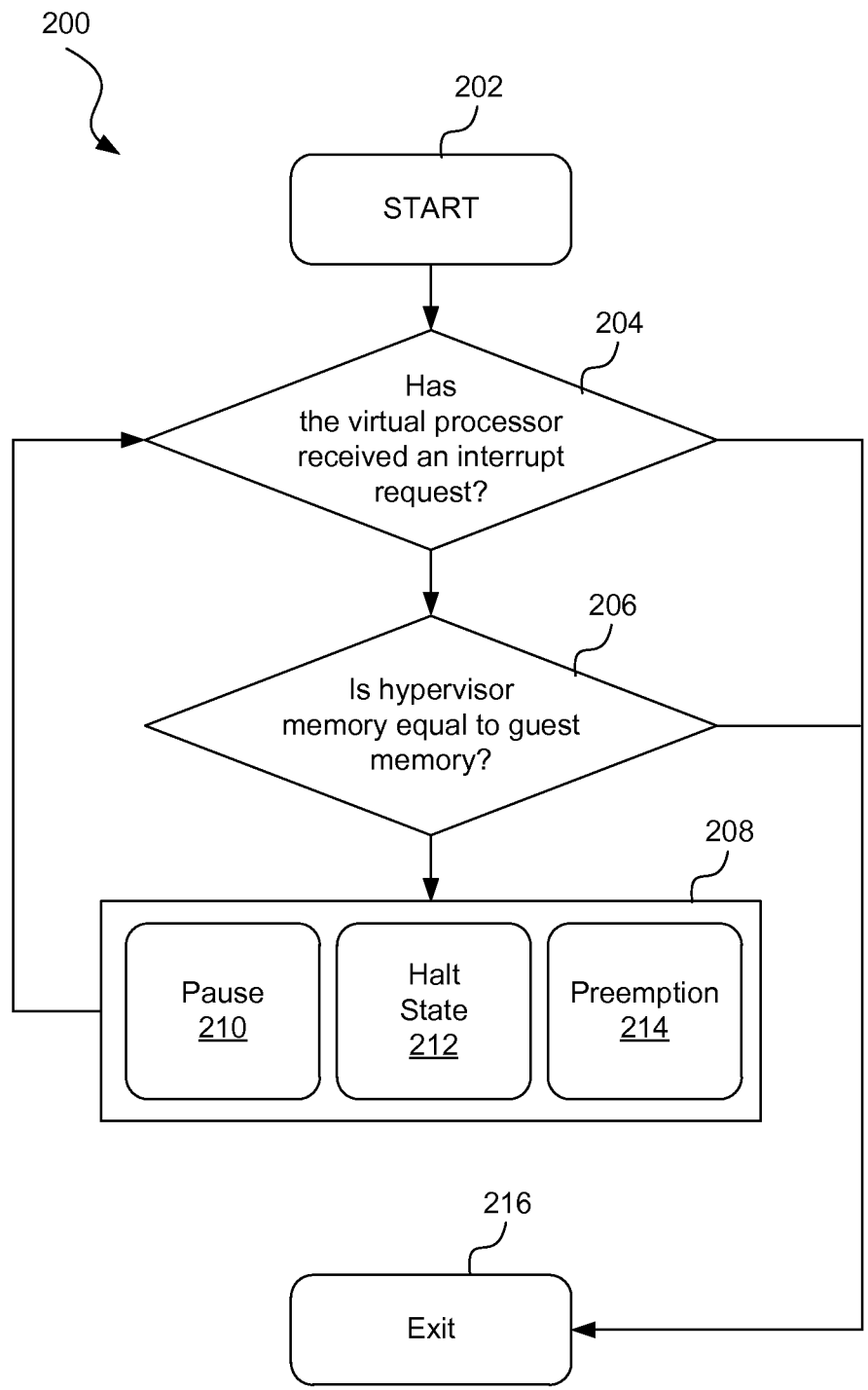
FIG. 2 is a diagram showing an illustrative flowchart for a loop executed by a hypervisor to emulate memory monitoring, according to one example of principles described herein.

FIG. 2 is a diagram showing an illustrative flowchart for a loop 200 executed by a hypervisor to emulate MONITOR and MWAIT command functionality. According to the present example, the loop 200 starts 202 when the hypervisor detects that a guest has executed the MWAIT command on the virtual processor. The loop 200 continues until occurrence of an event that causes exit of the loop 200 as described below.

As described above, the MWAIT command puts a physical processor in a halt state until a store operation has occurred at the memory address designated by the MONITOR command. But, the physical processor can be awakened through other means such as various interrupt requests. Thus, to emulate such functionality, the loop includes a step 204 for determining whether the virtual processor has received an interrupt request for which the virtual processor should be awakened. If so, then the hypervisor exits 216 the loop.

The loop 200 further includes a step 206 for determining if the hypervisor memory is equal to the guest memory. Specifically, the hypervisor compares the data within the designated range of addresses, which are in guest memory, with the copy of the data stored in the hypervisor memory. If the hypervisor memory and the guest memory are the same, then the loop 200 continues. But, if the data within the guest memory is different than the corresponding data in the hypervisor memory, then it is known that another process is intending to awaken the virtual processor, and the loop 200 is exited 216.

The loop also includes a waiting operation 208 that provides the analogous halt functionality of the MWAIT command. The waiting operation 208 may include one or more different commands. Such commands include a pause function 210, a halt state function 212, or a preemption enabling function 214.

In one example, the waiting operation 208 includes the pause function 210. The pause function may be for example, the no operation (NOP) function of the x86 instruction set architecture. Such a function causes the virtual processor simply to perform no instruction, but increment the program counter by the length of the NOP instruction.

In one example, the waiting operation 208 includes a halt state function 212. For example, the Advanced Configuration and Power Interface (ACPI) specification provides for a number of processor sleep states, sometimes referred to as C states. While virtual processors typically do not utilize all of the C states specified in the ACPI, virtual processors may utilize an operating state and a basic halt state. Thus, the waiting operation 208 may cause the virtual processor to enter a halt state for a predefined period of time. In one example, the predefined period of time is 1 microsecond, 2 microseconds, or 5 microseconds.

In one example, the waiting operation 208 includes enabling preemption 214. Enabling preemption allows the underlying physical processor 104 to switch to a different context. For example, while preemption is enabled, the virtual processor may switch to the context of a different virtual machine. After a period of time, the virtual processor will return to the context of the loop 200 being executed by the hypervisor.

After the waiting function 208 is completed, the loop returns to step 204, and the process described above is repeated. This process is repeated until the conditions are such that the loop is exited 216. This process essentially emulates the functionality of the MONITOR and MWAIT commands.

Figure 3A:
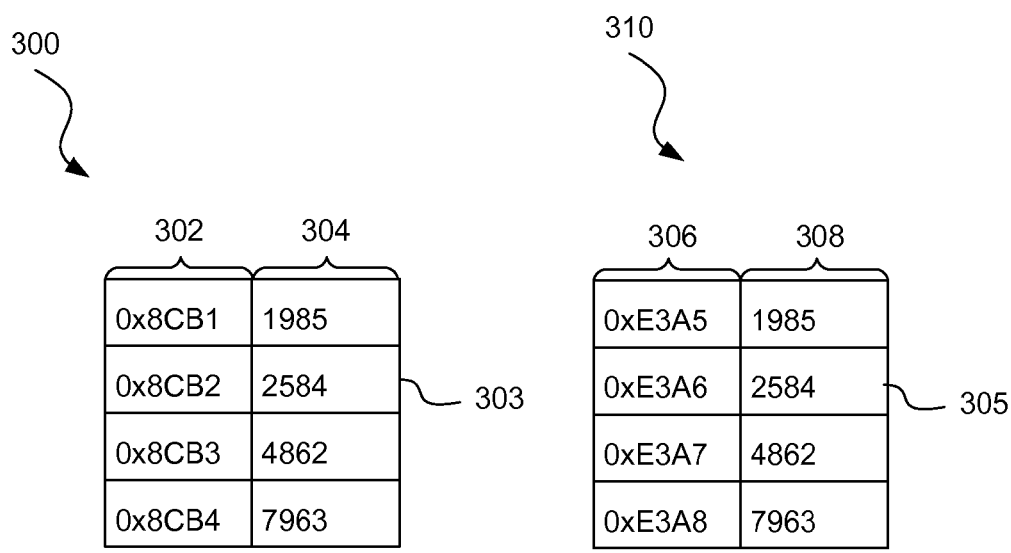
FIGS. 3A and 3B are diagrams showing an illustrative comparison between guest memory and hypervisor memory, according to one example of principles described herein.
Figure 3B:
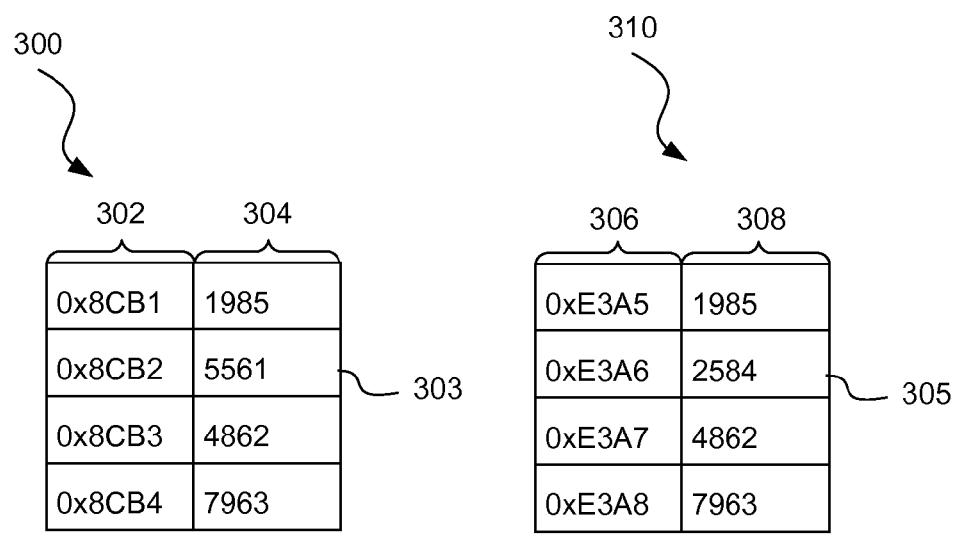

FIGS. 3A and 3B are diagrams showing an illustrative comparison between guest memory 300 and hypervisor memory 310. FIG. 3A illustrates a comparison between guest memory 300 and hypervisor memory 310 before a change in guest memory 300 occurs. According to the present example, the guest memory 300 includes a range of addresses 302 that are designated by the MONITOR command executed by the guest. The memory addresses have data 304 stored therein. The data may be any type of data in any appropriate format.

As described above, when the hypervisor detects that the guest has executed the MONITOR command, the hypervisor copies the data 304 from the designated range of memory addresses 302 into the hypervisor memory 310. Thus, the hypervisor memory 310 includes a set of addresses 306 that store data 308 similar to the data 304 of the guest memory 300. For example, a particular value 303 within the guest memory 300 is equal to a corresponding value 305 within the hypervisor memory 310.

FIG. 3B illustrates a comparison between guest memory 300 and hypervisor memory 310 after another process performs a store operation within the range of addresses 302. Specifically, the value 303 has changed as a result of being overwritten by the other process. The exact value that has been written to the memory is not important. Specifically, when the loop executed by the hypervisor in response to the MWAIT command compares the value 303 in guest memory 300 with the value 305 in hypervisor memory, it will be determined that the store command has been executed, thus intending to wake the processor.

Figure 4:
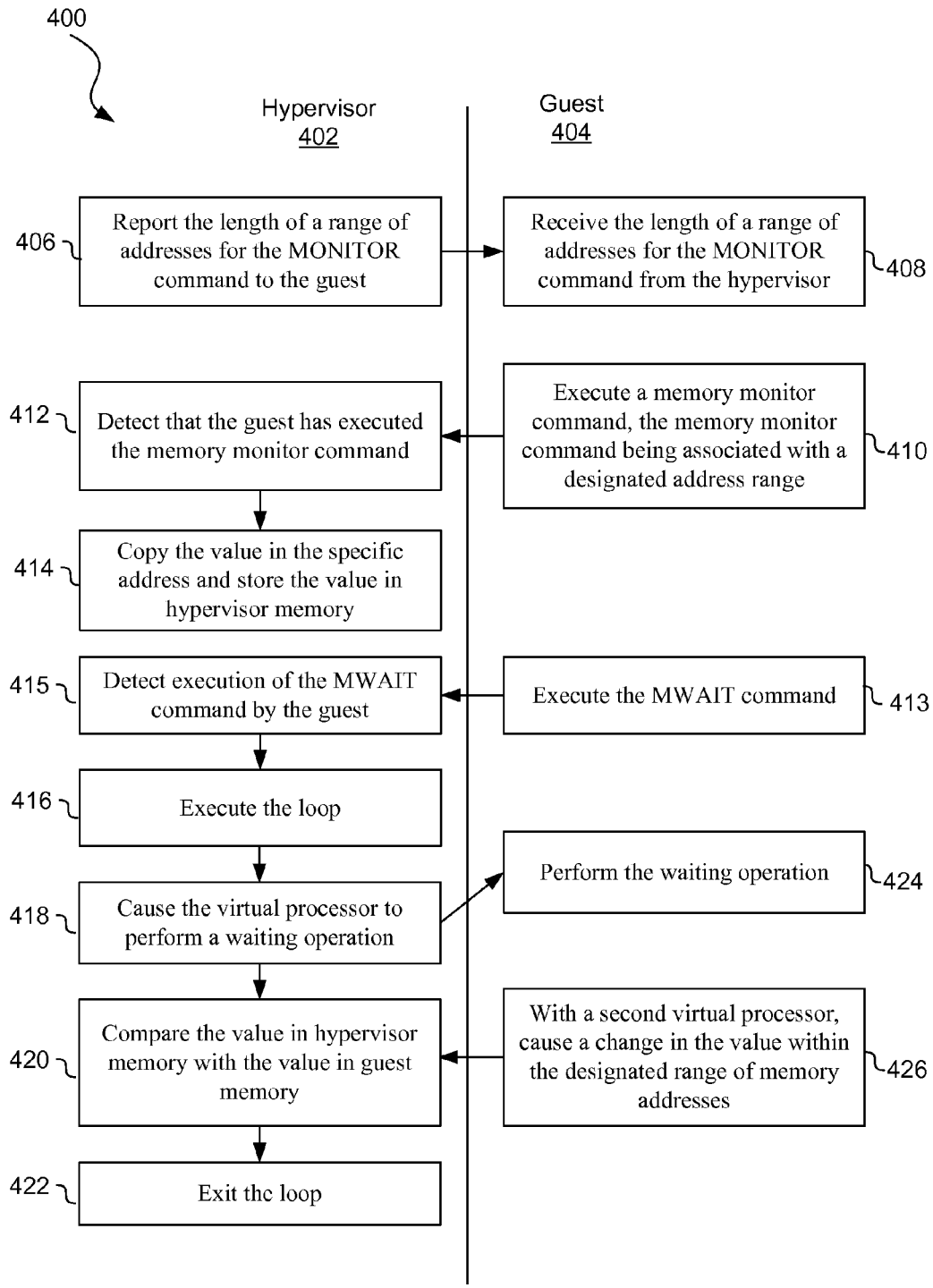
FIG. 4 is a flowchart showing an illustrative method for providing virtual processor sleep states, according to one example of principles described herein.

FIG. 4 is a flowchart showing an illustrative method for providing virtual processor sleep states. The steps illustrated on the left side are steps that are executed by a hypervisor 402. The steps on the right side are steps that are executed by a guest 404. According to the present example, sometime after a hypervisor loads a virtual machine, at step 406, the hypervisor 402 may report the length of a range of addresses for the MONITOR command. This indicates the size range of addresses that can be monitored using the principles described above. At step 408, the guest 404 receives the length of a range of addresses for the MONITOR command from the hypervisor 404. This may be done, for example, by using the CPUID command associated with x86 instruction set architecture.

The method further includes a step 410 for, with the guest 404, executing a memory monitor command, the command being associated with a designated address. This command is executed for a specific virtual processor. The hypervisor 402 then detects, at step 412, that the guest 404 has executed the memory monitor command. In response, at step 414, the hypervisor copies the value in the designated range of memory addresses and stores the copy in hypervisor memory.

At step 413, the guest 404 executes a wait command such as the MWAIT command. At step 415, the hypervisor 402 detects that the guest has executed the MWAIT command. At step 416, the hypervisor 402 then begins execution of the loop as described above.

The loop includes a step 418 that causes the virtual processor to perform a waiting operation. As described above, this waiting operation may include a pause command, a halt state, or enabling preemption. At step 424, the guest 404 causes the virtual processor to perform the appropriate waiting operation.

In the present example, at step 426, to cause the hypervisor 404 to exit the loop, a second virtual processor associated with the guest 404 causes a change in the value within the designated range of memory addresses specified by the memory monitor command. Thus, at step 420, when the hypervisor 402 compares the value in hypervisor memory with the value in guest memory, the hypervisor 402 will detect the difference in values and exit the loop at step 422.

Some examples of processing systems described herein may include non-transient, tangible, machine readable media that include executable code that when run by one or more processors (e.g., processor 104) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
with a hypervisor, detecting that a guest system has executed a memory monitor command for a virtual processor;
making a copy of data that is stored at a guest memory address associated with the memory monitor command;
storing the copy at a hypervisor memory address;
with the hypervisor, in response to detecting that the guest system has executed a wait command, executing a loop until the copy is different than the data stored in the guest memory address; and
within the loop, causing the virtual processor to enter a halt state for a predetermined period of time.

2. The method of claim 1, further comprising, within the loop, causing the virtual processor to execute a pause instruction.

3. The method of claim 1, further comprising, within the loop, enabling preemption for the virtual processor.

4. The method of claim 1, further comprising, with the hypervisor, reporting a buffer length allowed for monitoring to the guest.

5. The method of claim 1, wherein the memory monitor command comprises an x86 MONITOR command and the wait command comprises an x86 MWAIT command.

6. The method of claim 1, further comprising, exiting the loop in response to the virtual processor receiving an interrupt from an external event.

7. The method of claim 1, wherein the data stored in the memory address is changed in response to a store command from a different virtual processor.

8. The method of claim 1, wherein the data stored in the memory address is changed in response to a store command from a different virtual processor.

9. The method of claim 4, wherein reporting the length is performed using an x86 CPUID command.

10. A method comprising:
with a guest system running on a virtual machine, executing a memory monitor command for a virtual processor, wherein execution of the memory monitoring command causes a hypervisor to make a copy of data stored at a guest memory address associated with the memory monitor command, the copy being placed in a hypervisor memory address;
with the guest system, executing a wait command to cause the hypervisor to execute a loop, the hypervisor being configured to exit the loop if a data value stored in the guest memory address is different than a data value stored in the copy; and
in response to being interrupted by an event, causing the hypervisor to exit a loop, wherein the hypervisor is configured to, within the loop, enable preemption for the virtual processor.

11. The method of claim 10, wherein the hypervisor is configured to cause the virtual processor to execute a pause command within the loop.

12. The method of claim 10, wherein the hypervisor is configured to cause the virtual processor to enter a halt state for a predetermined period of time within the loop.

13. The method of claim 10, further comprising, with the guest, receiving a report of a buffer length allowed for monitoring from the hypervisor.

14. The method of claim 10, wherein the memory monitor command comprises an x86 MONITOR command and the wait command comprises an x86 MWAIT command.

15. The method of claim 13, wherein the length is reported using an x86 CPUID command.

16. A computing system comprising:
a processor; and
a memory comprising computer readable instructions that when executed by the processor, cause the system to:
run a hypervisor to host a virtual machine;
detect that a guest system utilizing the virtual machine has executed a memory monitor command for a virtual processor;
make a copy of data stored at a guest memory address associated with the memory monitor command;
store the copy in a hypervisor memory address;
detect that the guest system has executed a wait command;
execute a loop that includes a waiting operation in response to detecting the wait command, wherein the waiting operation comprises entering a halt state for a predetermined period of time; and
exit the loop when the copy is different than the data stored in the memory address.

17. The system of claim 16, wherein the waiting operation comprises at least one of the following:
executing a pause command;
or
enabling preemption.

18. The system of claim 16, wherein the processor is further to cause the system to report a buffer length allowed for monitoring to the guest.

19. The system of claim 16, wherein the memory monitor command comprises an x86 MONITOR command and the wait command comprises an x86 MWAIT command.

20. The system of claim 16, wherein the data stored in the memory address is changed in response to a store command from a different virtual processor.

* * * * *